(12) United States Patent
Clark

(10) Patent No.: US 6,678,528 B2
(45) Date of Patent: Jan. 13, 2004

(54) WIRELESS HANDSET NOTIFICATION OF A CALL PROCESSING EVENT

(75) Inventor: David R. Clark, Longmont, CO (US)

(73) Assignee: Qwest Communications International, Inc., Denver, CO (US)

( * ) Notice: Subject to any disclaimer, the term of this patent is extended or adjusted under 35 U.S.C. 154(b) by 196 days.

(21) Appl. No.: 09/935,963

(22) Filed: Aug. 23, 2001

(65) Prior Publication Data

US 2003/0040325 A1 Feb. 27, 2003

(51) Int. Cl.[7] .................................................. H04Q 7/20
(52) U.S. Cl. ........................ 455/461; 455/466; 455/417; 379/211.02; 379/212.01
(58) Field of Search .......................... 455/461–466, 455/403, 414, 418, 424, 428, 433, 462, 465, 417, 557; 379/210.3, 211.01, 211.02, 212.01, 213.01, 157, 201.1

(56) References Cited

U.S. PATENT DOCUMENTS

| | | | |
|---|---|---|---|
| 5,754,630 A | 5/1998 | Srinivasan | 379/88 |
| 5,805,688 A | 9/1998 | Gillespie et al. | 379/220 |
| 5,901,359 A * | 5/1999 | Malmstrom | 455/461 |
| 5,920,812 A * | 7/1999 | Palviainen | 455/417 |
| 5,974,331 A | 10/1999 | Cook et al. | 455/461 |
| 6,094,574 A * | 7/2000 | Vance et al. | 455/415 |
| 6,134,314 A | 10/2000 | Dougherty et al. | 379/207 |
| 6,219,542 B1 * | 4/2001 | Aas et al. | 455/422 |
| 6,266,523 B1 | 7/2001 | Cook et al. | 455/403 |
| 2003/0181202 A1 * | 9/2003 | Link et al. | 455/417 |

* cited by examiner

Primary Examiner—Congvan Tran
(74) Attorney, Agent, or Firm—Marsh Fischmann & Breyfogle LLP

(57) ABSTRACT

A system and method are provided which allow a wireless handset in a wireless network to be notified of a call processing event, such as an incoming telephone call, occurring at a directory number in the Public Switched Telephone Network (PSTN). The system monitors the directory number for predetermined call processing events. Once a predetermined event is detected, a call handling request is sent to a processing node in the PSTN which searches a database for information related to the event. Using information related to the event, an alphanumeric notification message indicative of the event is generated. The notification message is then sent to a messaging center in the wireless network for delivery to the wireless handset.

18 Claims, 2 Drawing Sheets

WIRELESS HANDSET NOTIFICATION OF A CALL PROCESSING EVENT

FIELD OF THE INVENTION

This invention relates to a system and method for notifying a wireless handset of a predetermined event occurring at a directory number in the Public Switched Telephone Network. More particularly, the system and method provide for utilizing an alphanumeric message to notify the wireless handset of the predetermined event.

BACKGROUND OF THE INVENTION

The use of both a conventional landline and a wireless phone has become a common practice amongst business persons and consumers alike. Commonly, people who need or wish to stay in touch at all times use both a landline and a wireless phone. Wireless and landline systems typically operate completely independent of each other, supported respectively by a wireless network and a 'wireline' network generally referred to as the Public Switched Telephone Network (PSTN). As a result, users with both devices typically have a PSTN directory number (DN) and a separate wireless mobile identification number (MIN) for each of their respective user devices. Therefore, a call placed to one device will not register with the other, accordingly if one is away from the landline's physical location when an incoming call arrives, the user will have no knowledge of the incoming call through their wireless phone.

Known systems for redirecting or forwarding phone calls currently allow a subscriber to redirect calls from their PSTN terminal to their wireless unit. However, these systems are directed to people who require or desire instant connection to their incoming calls. Often redirecting the incoming calls provides more service than a consumer may want or need. Additionally, if a redirected call is unanswered and no message is left, the subscriber has no notice of the call.

SUMMARY OF THE INVENTION

It is, therefore, an object of this present invention to provide a system and method to notify a subscriber's wireless phone via an alphanumeric message that a call has been placed to their landline.

In carrying out the above objective, there is provided a system for notifying a subscriber's wireless handset via an alphanumeric message that a call has been placed to a designated telephone number. In one embodiment, the system comprises monitoring apparatus for monitoring telephony traffic at one or more locations (i.e. telephone numbers) in a telephony network. According to the system described herein, the telephony network may include elements of both the Public Switched Telephone Network (PSTN) and a wireless network. The monitoring apparatus may be operable to detect a predetermined condition at a specified phone number and generate a handling request regarding that predetermined condition. The telephony network may further include a processing node, such as a service control point (SCP), configured to retrieve instructional information upon receipt of the handling request and generate an alphanumeric message indicative of the predetermined condition. Also included in the system is a message center in communication with a designated wireless handset's Home Location Register (HLR) configured to deliver the message to said wireless handset.

In one aspect of the present invention, the public switched telephone network comprises components of an Advanced Intelligence Network (AIN). In this embodiment, the apparatus connected to the telephony system for detecting a predetermined condition comprises an AIN capable central office switch serving the designated telephone number. This central office switch may be triggered upon encountering a predetermined condition, such as an incoming phone call, to suspend call processing of the incoming call and generate a call handling request regarding the predetermined condition. In this regard, the central office switch may send a message to the processing node indicating the predetermined condition has occurred.

The processing node is capable of receiving call handling requests from the monitoring apparatus, searching a database using parameters of the call handling request for instructional information, and generating a notification message using the instructional information. The SCP may be in communication with a database which contains instructional information related to the predetermined condition that may be searched using selectable parameters of the call handling request. The instructional information stored by the database will include at a minimum, protocol for generating a notification message indicative of the predetermined condition and routing instructions such as a mobile identification number (MIN) for the wireless handset to be notified. Additionally, the SCP may search external and/or additional databases for information related to the predetermined condition. In one embodiment, the protocol stored in the database and used to generate notification messages will comprise Short Message Service (SMS) protocol such that an alphanumeric SMS notification message will be generated. After generating the notification message, the processor may be further operable to initiate delivery of the message to a message center in the wireless network where the message may be delivered to the wireless handset.

The message center is configured such that it is in communication with the processing node and operable to receive the notification message therefrom. Additionally, the message center is operable to query a Home Location Register (HLR) associated with the wireless handset and effectuate delivery of the message to the wireless handset. In one embodiment the message center comprises a Short Message Service Center (SMSC) capable of receiving a notification message created using SMS protocol. The SMSC may be configured such that upon receipt of the SMS notification message it will immediately deliver the notification message if the wireless handset is available or, if the wireless handset is unavailable, store the message and either attempt delivery at a later time or allow a user to access the stored messages.

In carrying out the above objective, described herein is a method for notifying a subscriber's wireless handset via an alphanumeric message that a call has been placed to a designated landline directory number. In this regard, the first step of the method comprises detecting a predetermined condition associated with the directory number. The predetermined condition will generally comprise an incoming call; however, the predetermined condition may also include a number of other call processing events such as an unanswered call, a call transferred to voicemail, a call originating from a pre-approved phone number, etc. In one embodiment, the predetermined conditions may be user settable such that a user can designate what events they are to be notified of or designate what times they wish the notification messaging system to be operable.

Upon detecting a predetermined condition associated with the directory number, a query is generated to identify information in a database related to the predetermined condition. This query may include parameters of the predetermined condition such as, for example, in a case of an incoming phone call, the incoming call's Automatic Number Identification (ANI) number (also known as caller ID). A single database or multiple databases, such as Line Information Databases (LIDBs), may be employed which contain additional information such as a caller's name or address may be searched to identify information related to the predetermined condition. At least one database will contain information for use in generating an alphanumeric message in accordance with present invention and routing information for locating the wireless handset. In one embodiment, a database will contain information such that an SMS message may be generated for notification purposes.

Once all information regarding the predetermined event is located, an notification message indicative of the predetermined condition is generated. At a minimum, the notification message will contain routing instructions for its delivery to the subscriber's wireless handset in the wireless network, and an alphanumeric message indicative of the predetermined condition. In one embodiment, the notification message will contain the incoming call's ANI and, if available, the incoming caller's name.

After the message is generated, it is launched to the wireless network for delivery to the wireless handset. When SMS messaging is used, the message will be sent to a Short Message Service Center (SMSC) for final delivery to the subscriber's handset. As will be appreciated, delivery of the message by a SMSC allows nearly immediate message delivery if the SMSC locates the designated wireless handset or allows the message to be stored until the location of the handset becomes known. As will be appreciated, a user will have a record of all calls placed to the designated landline regardless of whether or not a voice message is left.

DETAILED DESCRIPTION

Figure 1:
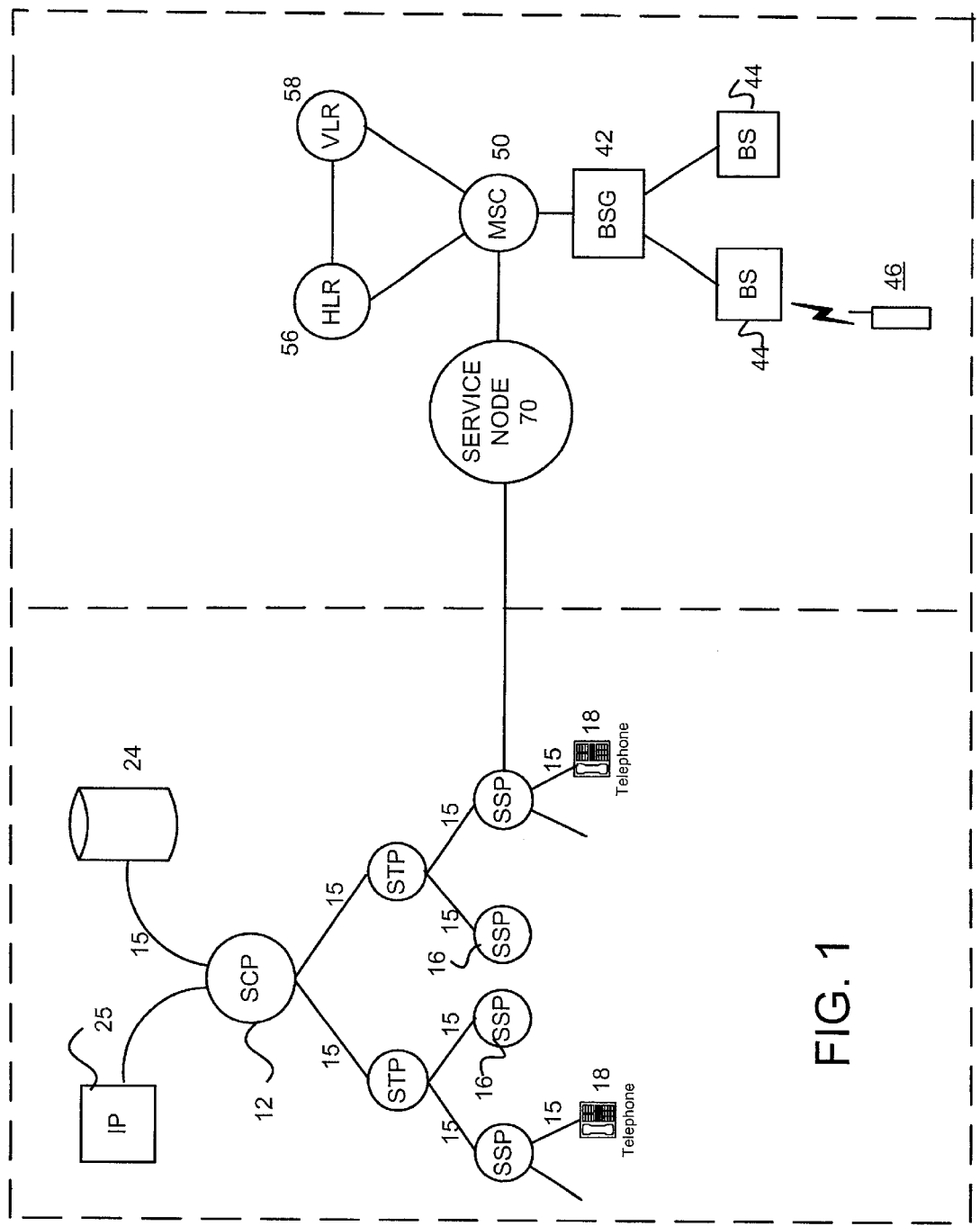
FIG. 1. discloses an integrated wireline/wireless network incorporating a Short Message Service Center (SMSC) according to the present invention.

FIG. 1 discloses a diagram of a telephony system in accordance with the present invention, which includes a public switched telephone network (PSTN) 10 and a wireless communications network 40. In particular, FIG. 1 illustrates the interrelationship or linking of the PSTN and wireless communications network and their operations in accordance with the present invention.

PSTN 10 is representative of an Advanced Intelligent Network (AIN) comprising various packet switching elements and transmission links, including a Service Control Point (SCP) 12, Signal Transfer Points (STPs) 14, Service Switching Points (SSPs) 16, Customer Premise Equipment (CPE) 18, a database 24, and various electrical interconnections 15 therebetween. The PSTN architecture is implemented with common channel signaling systems 7 (SS7) protocol designed to be used primarily with high speed digital networks, though capable of controlled low speed analog facilities as well. As will be appreciated, the PSTN may contain various combinations of the above listed elements as well as other elements not depicted in FIG. 1.

The customer premise equipment (CPE) 18, which may comprise any of a number of devices such as a telephone, facsimile machine modem, etc., is in electrical communication with a SSP 16 through signaling link 15. The SSP 16 is generally a node (usually the subscriber's local switch/central office switch) that is operable to connect the CPE 18 with incoming calls and to process outgoing calls. In the illustrated embodiment, SSP 16 is an AIN capable switch that is able to recognize AIN "triggers" which may be initiated by any of a number of call processing events such as an incoming call, a call being transferred to voice mail, an outgoing call, etc. Upon an AIN trigger being initiated, SSP 16 communicates with SCP 12 (discussed herein) for instruction associated with the trigger. Typically, an AIN trigger is used to invoke an intelligent network service such as call forwarding or the notification messaging of the present invention. In accordance with the present invention, when SSP 16 recognizes a trigger associated with a predetermined condition, such as an incoming call, the SSP 16 generates a query for the SCP 12 requesting handling instructions regarding the predetermined condition. In response, SCP 12 initiates a search of the database and returns handling information, allowing SSP 16 to notify the subscriber's wireless handset that the predetermined condition has occurred.

The SSP 16 is electrically connected to SCP 12 via a STP 14 and various signaling links 15. STPs 14 are packet switches that are used to route signaling messages within the network such as call routing instructions between an SCP and a SSP. SCP 12 may be a software-driven node in the PSTN that, upon receiving a call handling request from a SSP 16, will provide call routing/handling instructions back to the SSP 16 pursuant to preprogrammed functionality. SCP 12 may further be configured to instruct SSP 16 to obtain and forward additional information regarding the predetermined condition associated with the trigger. SCP 12 may further comprise a database 24 for storing subscriber information and service logic needed to execute subscriber services. In accordance with the present invention, SCP 12 and its associated database 24 contain information regarding customer subscription to the notification service, routing information for use in establishing contact with the subscriber's wireless handset, and protocol for generating a notification message for delivery to the wireless handset 46 in the wireless network 40. In one embodiment, SCP 12 stores Short Message Service (SMS) protocol for use in generating an alpha-numeric notification message for receipt by the subscriber's wireless device 46, notifying the subscriber that the predetermined condition has occurred. SMS is used for the transmission of short text messages to and from a Short Message Entity (SME), as will be further discussed herein. Messages in this format typically are no longer than about 160 alphanumeric characters and contain no images or graphics.

SCP 12 may also interface with an AIN-intelligent peripheral 25 that can create a notification message from information and instructions supplied by the SCP. In this regard, the intelligent peripheral 25 receives message format protocol, routing instructions and information to include in the message instructions from SCP 12. As will be appreciated, the intelligent peripheral 25 may be a separate node in the telephony system, located within the SCP 12, or part of various other nodes within the telephony system such as the SSP/central office switch.

With further reference to FIG. 1, the wireless network 40 of the telephony system is shown, including: a cell site having a base station controller 42, a base station service radio transceiver 44, system interconnections, a wireless device 46, Mobile Switching Centers (MSCs) 50, a Home Location Register (HLR) 56, and a Visitor Location Register (VLR) 58. MSC 50 is known to those skilled in the art as a digital telephone exchange which controls the switching between PSTN and mobile cell sites for all wireline to wireless, wireless to wireline, and wireless to wireless calls. MSC 50 is the functional equivalent of the SSP 16 of the PSTN network 10. MSC 50 is configured to retrieve all necessary data to respond to subscriber call requests from the HLR 56 and VLR 58 (each discussed more fully herein). In turn, MSC 50 provides these databases (HLR 56 and VLR 58) with updated information on subscriber mobile registration status and location.

HLR 56 is a master database storing data related to each mobile subscriber, such as a subscriber profile and mobility information, together with their relevant permanent data, such as access capabilities and subscriber services. In addition, HLR 56 is in electrical communication with and provides MSC 50 with the information about the service area where the wireless device 46 is actually located, allowing incoming calls to be routed immediately to the subscriber's wireless device 46.

The VLR 58 is a temporary database for storing of information regarding the routing of incoming and outgoing calls to a wireless device 46 while in the VLR's coverage area. The VLR is in electrical communication with one or more MSCs and the wireless device's HLR while that device is in the VLR's coverage area. When the wireless device leaves the VLR's coverage area, the temporarily stored data is dynamically transferred to the HLR or a second VLR to allow the device to enter another coverage area without losing coverage.

In accordance with the present invention, a service node 70 is incorporated into the wireless network to receive the notification message from the PSTN. The service node 70 is operable to receive the notification message generated by the PSTN network and either immediately deliver the message to the user device or store the message for later delivery. In one embodiment, the service node comprises a Short Message Service Center (SMSC) 70 specifically configured to handle SMS messages. The SMSC is connected to the MSC over E1 lines using SS7 and is responsible for relaying, storing, and forwarding the SMS message from the PSTN to the user device 46. It will be appreciated that the service node, though shown as a separate entity, may be incorporated into any one of multiple nodes in either the wireless or PSTN networks.

In order to deliver the notification message, the wireless device 46 must be configured such that it is capable of receiving the notification message in the chosen format. For example, with a SMS notification message, the user device must be a Short Message Entity (SME) capable to receive and display an alphanumeric message, thus requiring that the wireless device contain a screen for displaying textual messages and internal programming or protocol to read the message.

To achieve the desired notification of a wireless handset in accordance with the current invention, the PSTN 10 and wireless network 40 work in concert. More particularly, an AIN trigger is set on the local switch (SSP) 16 of the designated phone number such that a predetermined condition, such as an incoming call, will activate the trigger. Upon trigger activation, the SSP 16 will suspend call processing and generate a call handling query which is delivered to SCP 12. The SCP 12 will search associated databases for call handling information associated with the predetermined condition. In the context of the SMS notification service the SCP will locate pertinent information to create a SMS formatted message, information to include in the SMS message, and routing information for delivering the message to a subscriber's wireless handset. The intelligent peripheral 25 will then use this information to generate a notification message, and send the message back to the SSP 16 for delivery to a service node 70 in the wireless network 40.

The wireless network service node 70 receives the notification message from the PSTN network and initiates delivery of the message to the wireless handset 46. In operation, the service node 70 attempts delivery of the message by querying a SMS capable MSC 50 to locate the wireless handset 46. The MSC 50 will contact the HLR 56 and/or a VLR 58 to determine if the handset is currently registered. If registered, the message is delivered; if the handset is not registered the service node 70 will store the message and attempt delivery at a future time. As will be appreciated, this system allows a subscriber to receive nearly immediate notification of predetermined conditions at their landline if they are available and, if they are not available, a stored record of the predetermined conditions that may be delivered or accessed at a later time.

Operation

During normal operations of the telephony network, a SSP monitors to detect predetermined conditions associated with a designated landline number. As noted above, the predetermined conditions associated with a designated landline may be any of a number of call processing events. In addition, the predetermined conditions may be user settable to accommodate individual needs. For example, a subscriber may choose to be notified of all incoming calls, all unanswered incoming calls, or incoming calls originating from telephone numbers which match those on a pre-approved list. Typically, the designated landline will be part of an AIN network and will contain AIN triggers at the SSP set such that they will be invoked by a predetermined condition. For purposes of this discussion, an 'incoming call' or 'call' is used in place of predetermined condition for clarity; however, as noted above the predetermined conditions may comprise any of a number of call processing events. Upon detection of an incoming call, the method of the present invention further entails the step of sending a query to the SCP requesting handling instructions for the incoming call. In one embodiment of the present invention, the query sent to the SCP will comprise selected parameters of the incoming call such as the call's automatic number identification (ANI) if available. Additionally, the query may include additional information such as the date and/or time of the incoming call.

Figure 2:
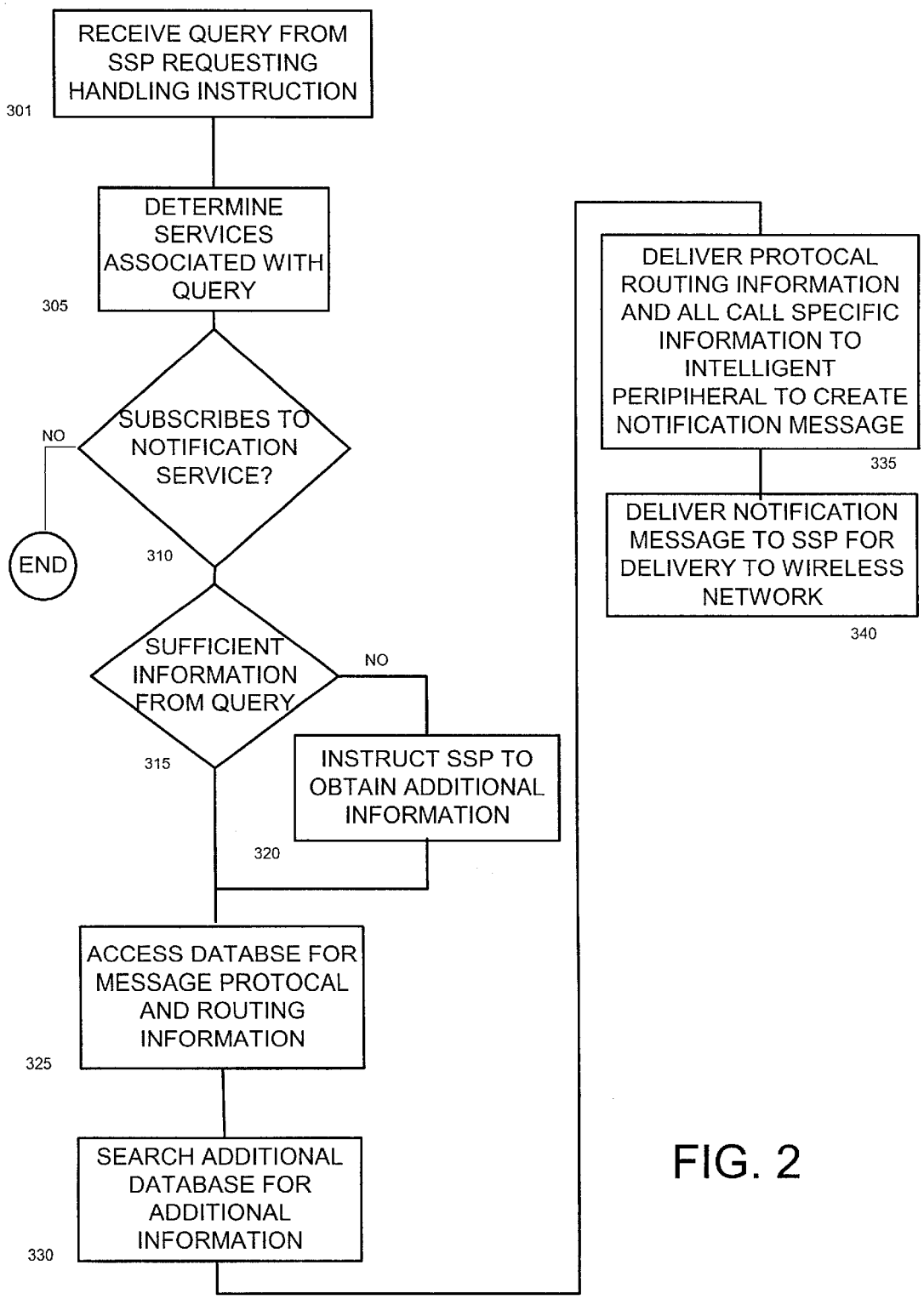
FIG. 2. discloses a block diagram of the method steps of the present invention.

Disclosed in FIG. 2 is a flow chart which describes the operations of the SCP when a call handling query is required. The call handling query may include service logic for generating a notification message according to the principles of the present invention and data associated with the user's wireless device to facilitate delivery of the notification message. The SCP receives the query (301) from the SSP indicating that an incoming call has invoked an AIN trigger. After receiving the query, the SCP determines what services are associated with the AIN trigger assigned to the designated telephone number (305). Accordingly, the SCP will determine whether the user subscribes to the notification messaging of the present invention (310). If the user does subscribe, the SCP will then determine if enough information is available to perform the notification messaging (315). If needed, the SCP can instruct the SSP to obtain and forward additional information regarding the incoming call (320). Once the SCP has sufficient information regarding the call, it may access attached databases for routing information and message generation protocol (325) as well as additional information from Line Information Databases (LIDBs) using, for example, the incoming call's ANI as a reference to search for additional information regarding the incoming call (330). This additional information, such as the incoming caller's name or address, may then be used in the generation of the notification message.

In the case of SMS notification messaging, the SCP will retrieve information regarding protocol for generating an SMS message and routing instructions for the subscriber's wireless device. SMS messages are displayable messages for transmission to SMEs that typically comprise alphanumeric characters as formatted (octets) or unformatted binary bits. The length of an SMS message is typically limited by system structure. For example, in wireless systems using SS7 as the PSTN to wireless carriage protocol, an SMS message package capacity is limited to 272 octets. A considerable portion of this is used for overhead information, such as addressing, for the receiving SME. The size of this overhead governs how much space of the message package will remain to carry the displayable message. In the typical implementation, the overhead information may require 92 octets, leaving 180 octets available for transmitting displayable message.

Once all the information regarding the predetermined condition has been compiled, it is delivered to an intelligent peripheral to generate the notification message (335). In one embodiment; the intelligent peripheral uses the SMS protocol and information associated with the incoming call to generate a displayable alpha-numeric notification message. Typically, the notification message will comprise the incoming call's ANI; however, if the ANI is not available (e.g. it is blocked or from out of the area) the notification message may be a generic message noting that a call was detected at the landline. Once generated, the notification message is delivered to the SSP with instructions for delivery to the wireless network (340).

The SSP delivers the SMS notification message to a service node in the wireless network over trunk lines attached to the wireless network infrastructure. In the case of an SMS notification message, the service node will comprise a Short Message Service Center (SMSC) in the wireless network. Once a message is received by the SMSC, the SMSC queries the HLR through a SMSC capable Mobile Switching Center for wireless handset location information. Once the HLR receives the request it will respond to the SMSC with the subscriber's status:

1) inactive or active; and, 2) where the subscriber is roaming.

If the response is active, then the HLR or a VLR where the wireless handset is currently registered will provide routing instructions for delivery of the notification message. If the wireless handset is inactive, the SMSC will store the message until the handset registers. When a subscriber accesses their user device, the HLR pages the SMSC and the SMSC will attempt delivery.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. In a telephony system including a wireless network and public switched telephone network (PSTN), a method to notify a wireless handset when a call is placed to a designated landline directory number (DN), said method comprising:

detecting a call directed toward a directory number of interest in the public switched telephone network;

generating a query to identify information in a database related to said directory number;

generating an alphanumeric message indicative of said call directed toward said directory number according to information retrieved from said database; and routing said alpha-numeric message to a message center for delivery to a wireless handset said database, such that said wireless handset is notified of said call directed towards said directory number in the public switched telephone network.

2. The method of claim 1, wherein said alphanumeric message is generated in accordance with Short Message Service protocol.

3. The method of claim 1, wherein said step of detecting said call directed towards said directory number further comprises detecting a call processing event associated with said call.

4. The method of claim 3, wherein said call processing event comprises one of a said call being transferred to voice mail, an said call being unanswered, said call originating from a pre-approved source, and said call processing event occurring during a predetermined period of time.

5. The method of claim 4, wherein said call processing event is user settable.

6. The method of claim 1, wherein said step of detecting is performed by an Advanced Intelligence Network (AIN) capable central office switch.

7. The method of claim 1, wherein said step of generating a query to identify information in a database further comprises including selected parameters associated with said call for use in searching said database.

8. The method of claim 7, wherein said selected parameters include an Automatic Number Identification (ANI) number of said call.

9. The method of claim 8, wherein said ANI is utilized to search at least one additional databases for information associated with said call.

10. The method of claim 1, wherein said alpha-numeric message includes selected parameters associated with said call.

11. The method of claim 10, wherein said alpha-numeric message includes an ANI associated with said call directed towards said directory number.

12. In a telephony system including a wireless network and public switched telephone network (PSTN) a system used to notify a wireless handset when a call is placed to a designated telephone, said system comprising:

an apparatus connectable to said telephony network to detect a call directed toward a specified telephone number in the PSTN and generate a handling request related to said call;

a processor configured to retrieve instructional information upon receipt of said handling request and generate an alphanumeric message indicative of said call; and a message center in the telephony system operable to communicate with a Home Location Register (HLR) associated with a predetermined wireless handset to effect delivery of said alphanumeric message to said wireless handset.

13. The system of claim 12, wherein said instructional information comprises protocol for use in generating a message according to Short Message Service (SMS) protocol.

14. The system of claim 13, wherein said instructional information further comprises routing instructions associated with said wireless handset.

15. The system of claim 12, wherein said apparatus comprises an Advanced Intelligence Network capable central office switch in communication with said specified telephone number.

16. The system of claim 12, wherein said processor comprises a Service Control Point for receiving said handling request and searching at least a first database for said instructional information related to said call.

17. The system of claim 12, wherein said message center comprises a short message service center (SMSC) capable of receiving an SMS notification message from said processor and delivering said SMS notification message to said wireless handset.

18. The system of claim 17, wherein said message center is operable to store said message for one of delayed delivery and user initiated retrieval.

* * * * *

UNITED STATES PATENT AND TRADEMARK OFFICE
CERTIFICATE OF CORRECTION

PATENT NO. : 6,678,528 B2
DATED : January 13, 2004
INVENTOR(S) : Clark

It is certified that error appears in the above-identified patent and that said Letters Patent is hereby corrected as shown below:

Column 8,
Line 20, delete "said database".

Signed and Sealed this

Ninth Day of March, 2004

JON W. DUDAS
*Acting Director of the United States Patent and Trademark Office*